(12) United States Patent
Su et al.

(10) Patent No.: US 7,805,567 B2
(45) Date of Patent: Sep. 28, 2010

(54) CHIPSET AND NORTHBRIDGE WITH RAID ACCESS

(75) Inventors: Chun-Yuan Su, Taipei (TW); Chau-Chad Tsai, Taipei (TW); Jiin Lai, Taipei (TW)

(73) Assignee: Via Technologies, Inc., Taipei (TW)

( * ) Notice: Subject to any disclaimer, the term of this patent is extended or adjusted under 35 U.S.C. 154(b) by 531 days.

(21) Appl. No.: 11/854,576

(22) Filed: Sep. 13, 2007

(65) Prior Publication Data
US 2008/0104320 A1 May 1, 2008

(30) Foreign Application Priority Data
Oct. 26, 2006 (TW) .............. 95139502 A

(51) Int. Cl.
*G06F 12/00* (2006.01)
(52) U.S. Cl. .................. 711/114; 711/111
(58) Field of Classification Search .......... 711/111, 711/114
See application file for complete search history.

(56) References Cited

U.S. PATENT DOCUMENTS

| | | | |
|---|---|---|---|
| 6,122,679 A * | 9/2000 | Wunderlich ............ 710/23 |
| 6,249,831 B1 * | 6/2001 | Allingham ............ 710/312 |
| 6,526,477 B1 * | 2/2003 | Yuan et al. ............ 711/114 |
| 6,831,916 B1 * | 12/2004 | Parthasarathy et al. ...... 370/359 |
| 2003/0126347 A1 | 7/2003 | Tan et al. |
| 2006/0026328 A1 | 2/2006 | Li |
| 2006/0143311 A1 * | 6/2006 | Madukkarumukumana et al. ............ 710/1 |
| 2006/0288130 A1 * | 12/2006 | Madukkarumukumana et al. ............ 710/22 |
| 2007/0143541 A1 * | 6/2007 | Nichols et al. ............ 711/114 |
| 2008/0052463 A1 * | 2/2008 | Chitlur et al. ............ 711/118 |

* cited by examiner

*Primary Examiner*—Hashem Farrokh
(74) *Attorney, Agent, or Firm*—Thomas, Kayden, Horstemeyer & Risley

(57) ABSTRACT

A Northbridge providing RAID access is coupled among a central processing unit, a system memory, and a Southbridge. Furthermore, the Northbridge further couples to a RAID through a Southbridge. The Northbridge include a RAID accelerator for performing RAID operations according to RAID control commands which are stored in a register.

13 Claims, 7 Drawing Sheets

CHIPSET AND NORTHBRIDGE WITH RAID ACCESS

BACKGROUND OF THE INVENTION

1. Field of the Invention

The invention relates to a chipset, and in particular, to a chipset with a redundant array of independent disks (RAID).

2. Description of the Related Art

To provide large volume, high read/write performance or security, redundant arrays of independent disks (RAID) are commonly utilized. RAID systems allow storage of the same data in different places (redundantly) on multiple disks. A number of disks are arranged in a disk array, referred as a disk set, and data is distributed in different places for improved data security. Moreover, the data can be partitioned into several segments and stored in different disks, allowing input/output operations to overlap in a balanced way, improving performance. In addition, by using a parity check, the RAID can read data on the disk array even if any one of the disks in the disk array is damaged.

FIG. 1 shows an embodiment of a computer system 100. The computer system 100 includes a RAID 130, a Southbridge 108, a Northbridge 104, a system memory 106 and a central processing unit 102. As shown in FIG. 1, it is assumed that the RAID 130 includes three disks 132, 134 and 136. The Southbridge 108 includes a disk controller 110 controlling storage to disks 132, 134 and 136. The Northbridge 104 is coupled among the Southbridge 108, the system memory 106 and the central processing unit 102.

As shown in FIG. 1, the disk controller 110 may be an integrated driver electronic (IDE) controller or an advanced host controller (AHC). The system memory 106 may be a dynamic random access memory (DRAM).

FIG. 2 is a flowchart showing the conventional method for performing RAID write. The central processing unit 102 firstly writes Data D1 to the system memory 106 (step S201). Then, the disk controller 110 reads data D2 from the disk 134 and writes the data D2 to the system memory 106 (step S202). Accordingly, the central processing unit 102 performs an exclusive OR (XOR) logical operation on data D1 and D2 to obtain a parity data DP (step S204). Next, the central processing unit 102 writes the parity data DP to the system memory 106 (step S205). Then, the disk controller 110 writes the data D1 to the disk 132 (step S206). Finally, the disk controller 110 writes the parity data DP to the disk 136 (step S207).

As noted, the central processing unit 106, however, handles most of the steps while performing RAID write, resulting in poor performance of the computer system.

BRIEF SUMMARY OF THE INVENTION

An exemplary embodiment of a chipset with RAID access includes a Northbridge coupled between a central processing unit and a system memory, having a RAID accelerator for performing RAID operations; and a Southbridge coupled between the Northbridge and a RAID having a plurality of hard disks, for accessing data in the RAID.

The invention also provides a Northbridge with RAID access. The Northbridge is coupled between a central processing unit and a system memory and further coupled to a RAID through a Southbridge. The Northbridge includes a RAID accelerator, performing RAID operations according to RAID control commands which are stored in a register in the Northbridge.

The invention further provides a method for performing RAID access. The method includes: snoops a memory mapping register; then, mapping a plurality of RAID control commands to a shadow register while the memory mapping register is accessed; reading a first data and a second data from a system memory according to the RAID control commands; performing an exclusive OR (XOR) logical operation of the first data and the second data to obtain a third data; and writing the third data to the system memory.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
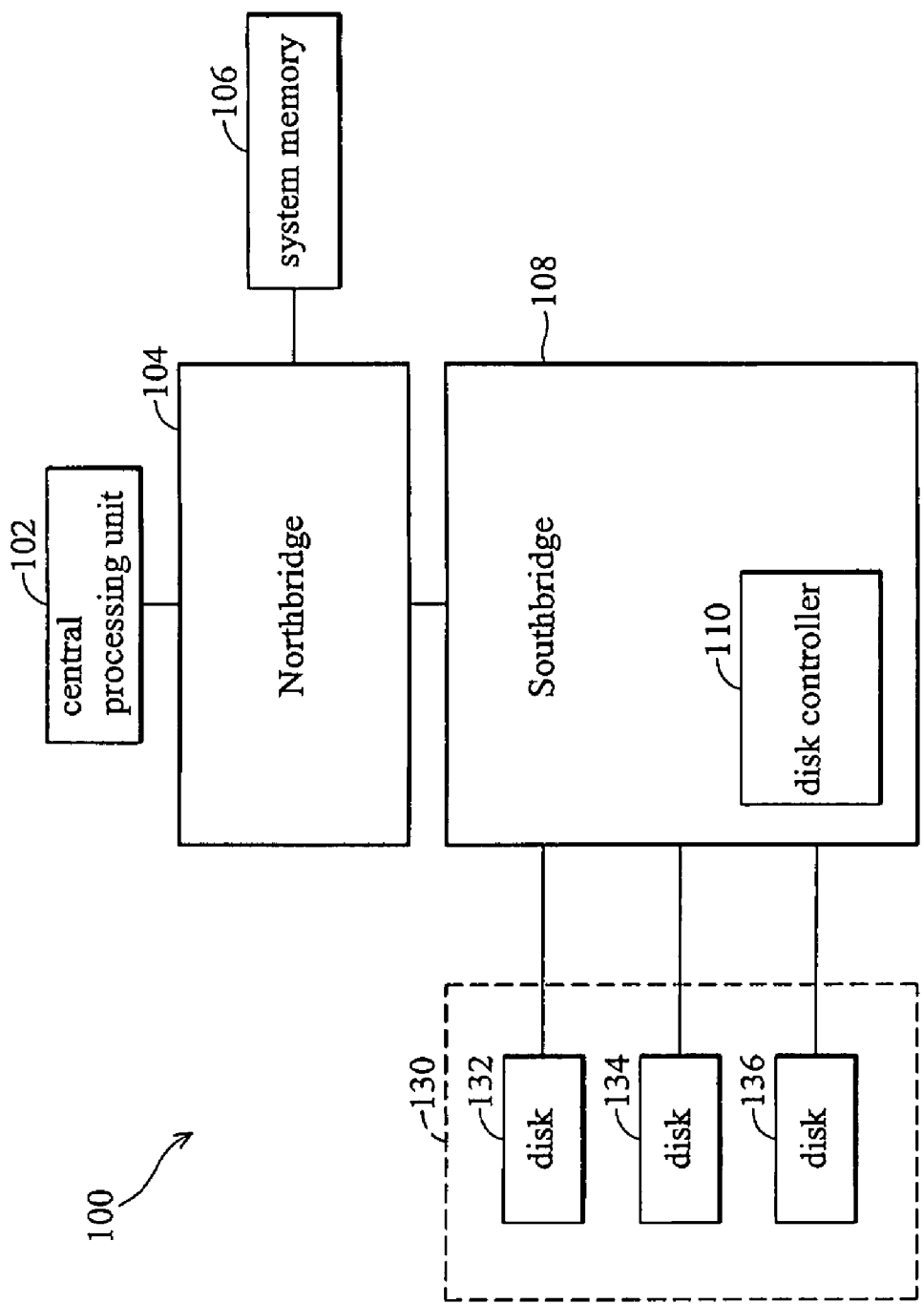
FIG. 1 shows an embodiment of a computer system supporting a RAID.
Figure 2:
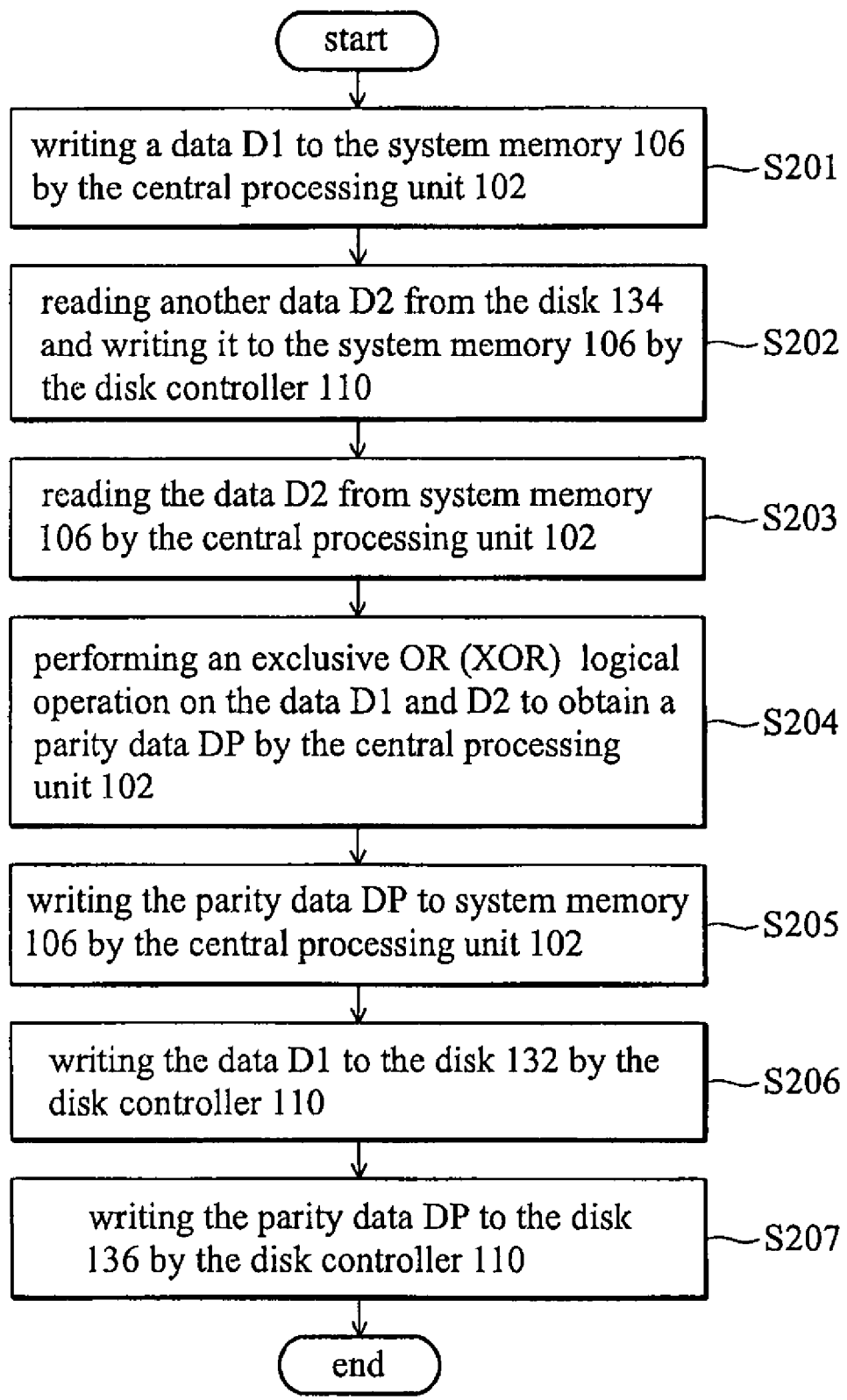
FIG. 2 is a flowchart showing the Southbridge performing RAID write.
Figure 3:
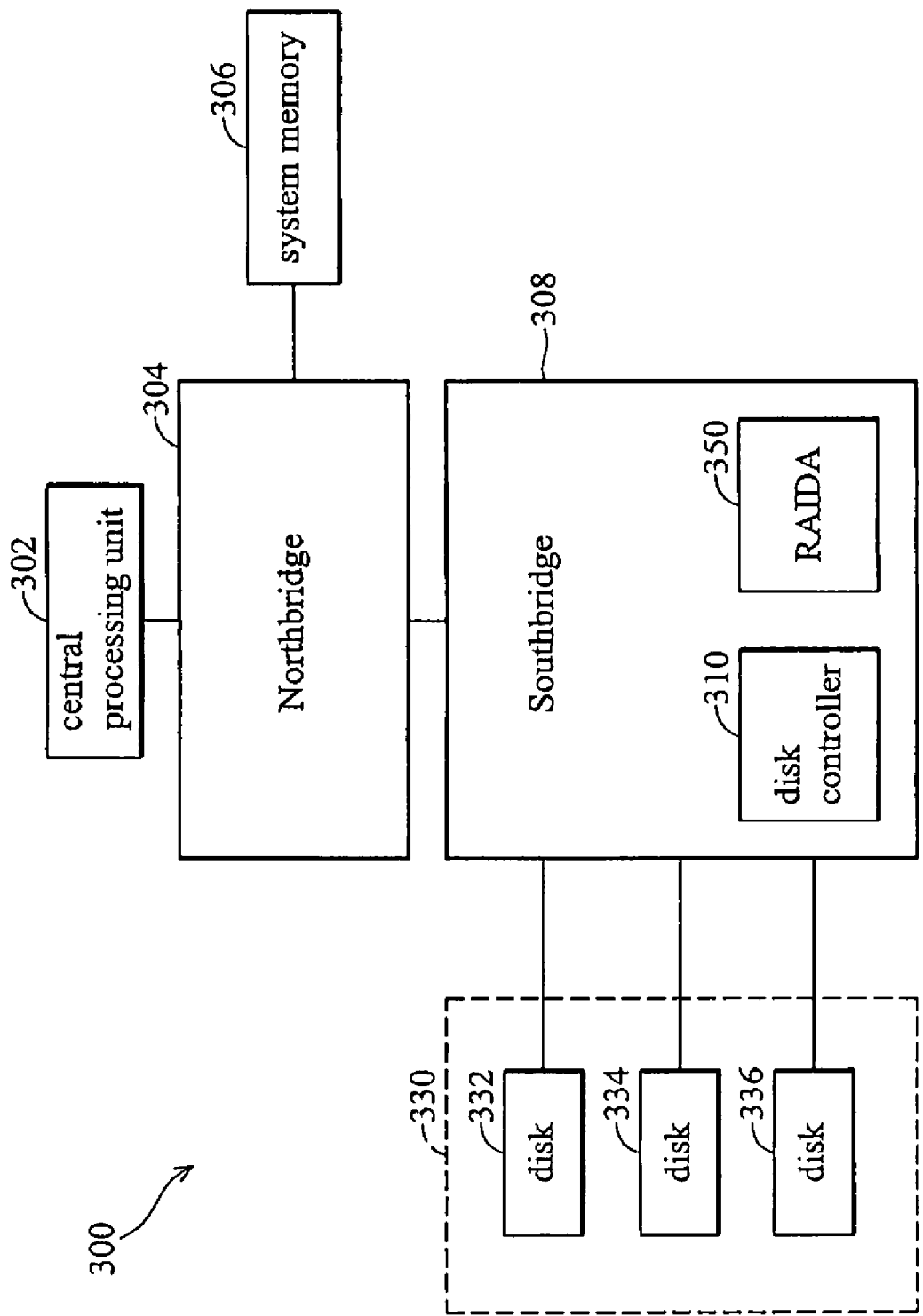
FIG. 3 shows a computer system with RAID access according to one embodiment of the invention.

FIG. 3 shows an embodiment of a computer system 300. The computer system 300 includes a RAID 330, a Southbridge 308 which performs RAID access (i.e. either RAID write or RAID write, a Northbridge 304, a system memory 306 and a central processing unit 302. It is assumed that, as shown in FIG. 3, the RAID 330 includes disks 332, 334 and 336. The Southbridge 308 includes a disk controller 310 dominating disk access of disks 332, 334 and 336, and a RAID accelerator 350 (RAIDA) for performing RAID operations. The Northbridge 304 is coupled among the Southbridge 308, the system memory 306, and the central processing unit 302 via buses.

Figure 4:
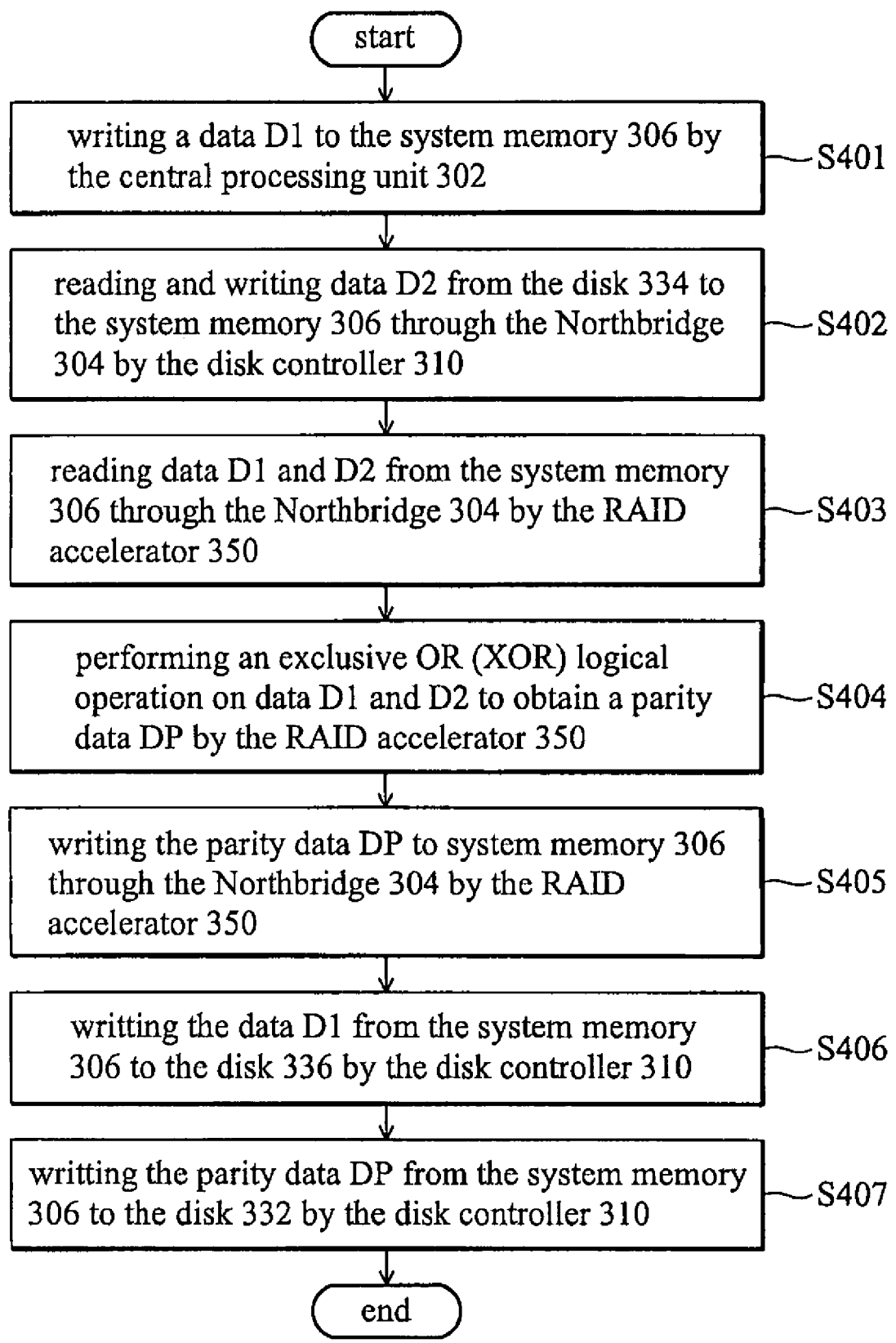
FIG. 4 is a flowchart showing one embodiment for performing RAID write in the invention.

FIG. 4 is a flowchart showing the method for performing RAID write. First of all, the central processing unit 302 writes Data D1 to the system memory 306 (step S401). Next, the disk controller 310 reads and writes data D2 from the disk 334 to the system memory 306 through the Northbridge 304 (step S402). Then, the RAID accelerator 350 reads data D1 and D2 from the system memory 306 through the Northbridge 304 (step S403). In addition, the RAID accelerator 350 performs an exclusive OR (XOR) logical operation of data D1 and D2 to obtain a parity data DP (step S404). Then, the RAID accelerator 350 writes the parity data DP to the system memory 306 through the Northbridge 304 (step S405). Next, the disk controller 310 writes the data D1 from the system memory 306 to the disk 336 (step S406). Finally, the disk controller 310 writes the parity data DP from the system memory 306 to the disk 332 (step S407).

It is observed that a RAID accelerator 350, embedded in the Southbridge 308, reduces the loading of the central processing unit 302 and improves performance of the computer system 300. However, bandwidth of the bus, connected the Northbridge 304 and Southbridge 308 is heavily because the busier transmission.

Figure 5:
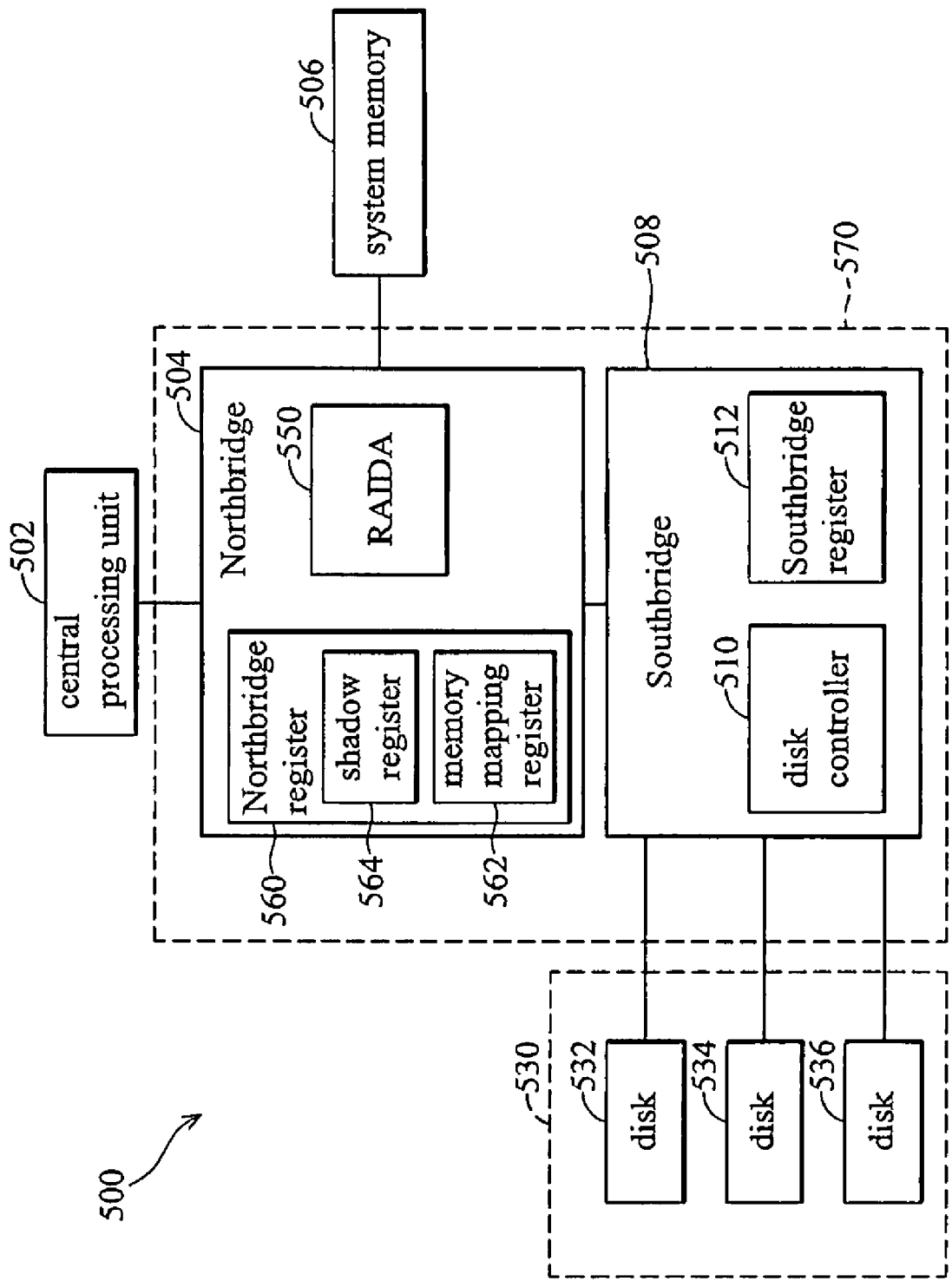
FIG. 5 shows another computer system with RAID access according to another embodiment of the invention.

FIG. 5 shows another embodiment of a computer system 500 according to one embodiment of the invention. The computer system 500 includes a RAID 530, a chipset 570, a system memory 506 and a central processing unit 502. In FIG. 5, the chipset 570 includes a Northbridge 504 and a Southbridge 508. In the present invention, assume the chipset performs RAID access (i.e. either RAID read or RAID write; for detail, the functions of RAID is implemented by the Northbridge 504. It is assumed that the RAID 530 has three disks 532, 534 and 536. The Southbridge 508 has: a disk controller 510 dominating disk access of disks 532, 534 and 536; and a Southbridge register 512 temporarily stores RAID control commands associated with RAID operations. The Northbridge 504 is coupled among the Southbridge 508, the system memory 506 and the central processing unit 502. In this embodiment, the RAID accelerator (RAIDA) 550 is built in the Northbridge 504 for performing RAID operations. Moreover, the Northbridge 504 further includes a Northbridge register 560 temporarily stores commands associated therewith.

With compare to FIG. 3, the RAID accelerator 350 is built in the Southbridge 308, so that the RAID accelerator 350 can easily perform RAID operations according to the RAID control commands stored in the Southbridge register (not shown in FIG. 3). In contrast, The RAID accelerator 550 of the FIG. 5 is built in the Northbridge 504, so that the RAID control commands should be copied from the Southbridge register 512 to the Northbridge register 560 for the RAID accelerator 550 before performing RAID operations.

In the present invention, Northbridge register 560 has a memory mapping register 562 storing disk access commands associated with the disk controller 510. In other words, the memory mapping register 562 is accessed while the disk controller 510 performs disk accesses. As a result, the Northbridge 504 would snoop the memory mapping register 562, and then map the control commands associated with the RAID operations from Southbridge register 512 to a shadow register 564 in the Northbridge register 560 while memory mapping register 562 is accessed. The shadow register 564 may be a specific area which is accessed respect to a memory mapping input output (MMIO) cycle.

Figure 6:
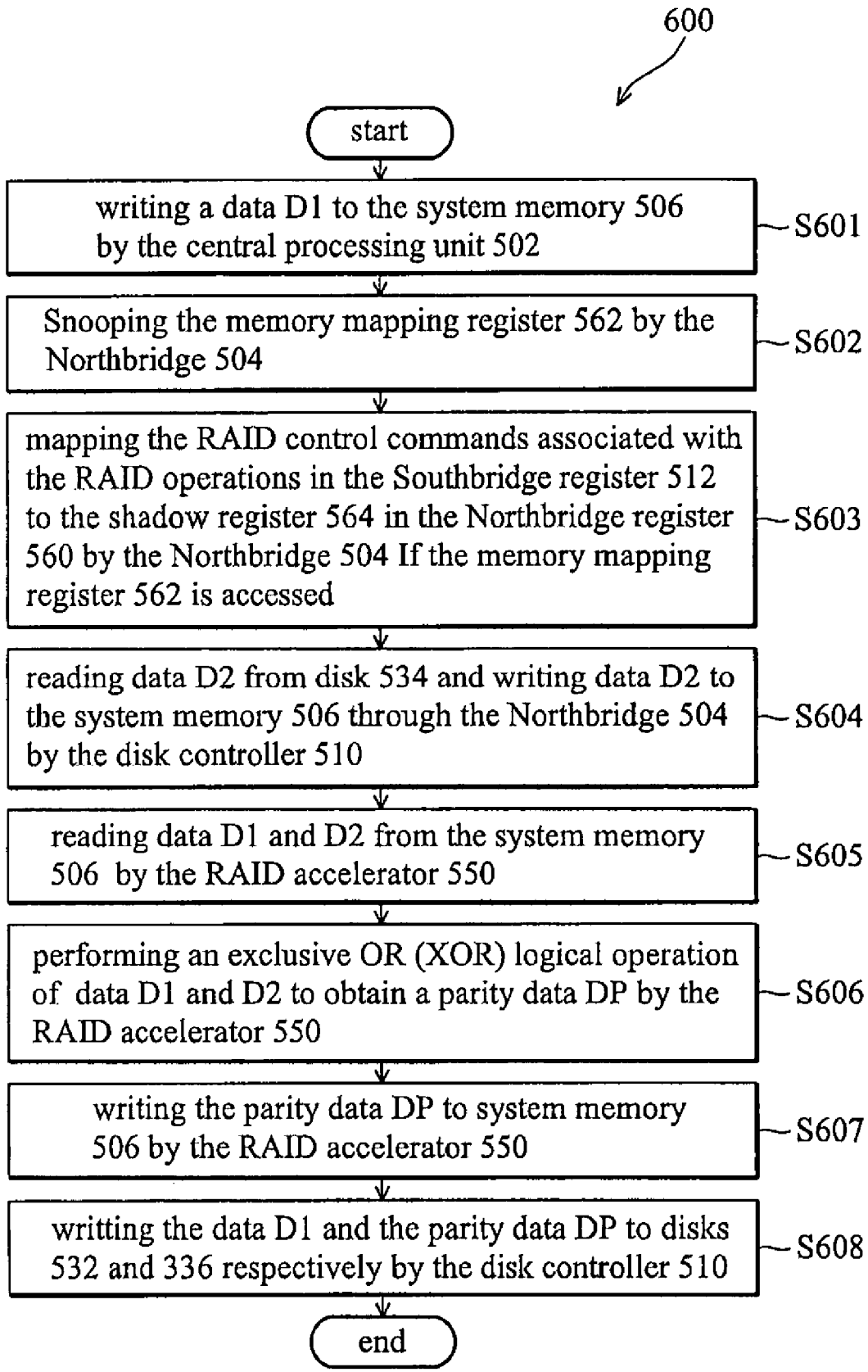
FIG. 6 is a flowchart showing another one embodiment for performing RAID write in the invention.

FIG. 6 is a flowchart 600 showing one method for computer system 500 to perform RAID write in the invention. Data D1 is first written to the system memory 506 by the central processing unit 502 (step S601). The Northbridge 504 snoops the memory mapping register 562 (step S602). If the memory mapping register 562 is accessed (i.e. operating system or other external command performs a write command to access), the Northbridge 504 maps the RAID control commands associated with the RAID operations in the Southbridge register 512 to the shadow register 564 in the Northbridge register 560 (step S603). Next, the disk controller 510 reads data D2 from disk 534 and writes data D2 to the system memory 506 through the Northbridge 504 (step S604). Accordingly, the RAID accelerator 550 reads data D1 and D2 from the system memory 506 according to the RAID control commands in the shadow register 564 (step S605). Next, the RAID accelerator 550 performs an exclusive OR (XOR) logical operation of data D1 and D2 to obtain a parity data DP (step S606). Then, the RAID accelerator 550 writes the parity data DP to the system memory 506 (step S607). Finally, the disk controller 510 writes the data D1 and the parity data DP to disks 532 and 336 respectively (step S608).

Figure 7:
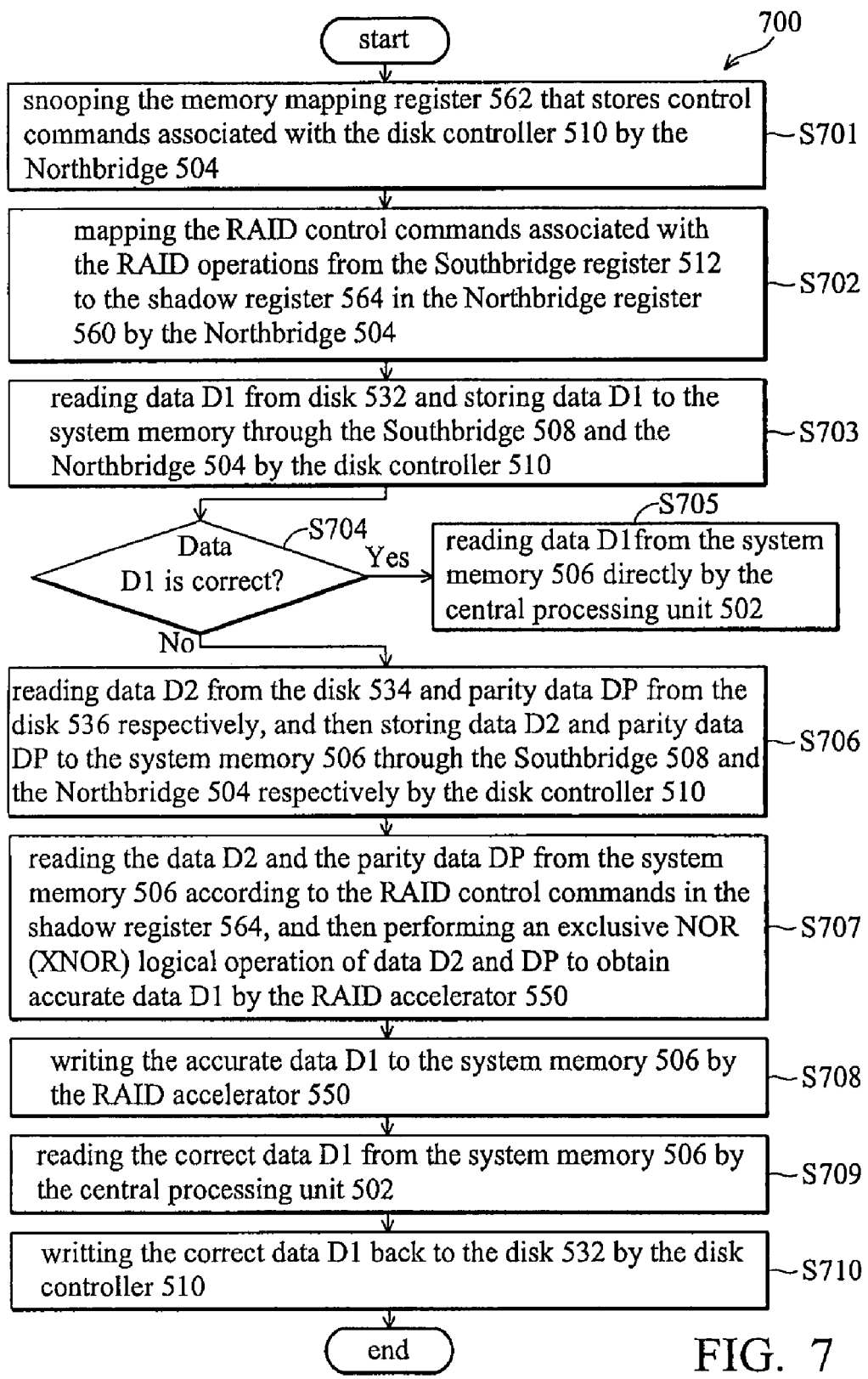
FIG. 7 is a flowchart showing one embodiment for performing RAID read in the invention.

FIG. 7 is a flowchart 700 showing another method for computer system 500 to perform RAID read in the invention. First, the Northbridge 504 snoops the memory mapping register 562 that stores control commands associated with the disk controller 510 (step S701). Next, the Northbridge 504 maps the RAID control commands associated with the RAID operations from the Southbridge register 512 to the shadow register 564 in the Northbridge register 560 (step S702). Then, the disk controller 510 reads data D1 from disk 532 and stores data D1 to the system memory through the Southbridge 508 and the Northbridge 504 (step S703). Then, determining whether the data D1 is correct (step S704). If so, the central processing unit 502 reads data D1 from the system memory 506 directly (Step S705). If data D1 is incorrect, the computer system 500 recovers data according to data D2 and the parity data DP. Therefore, Disk controller 510 reads data D2 from the disk 534 and parity data DP from the disk 536 respectively, and then stores data D2 and parity data DP to the system memory 506 through the Southbridge 508 and the Northbridge 504 respectively (step S706). Next, the RAID accelerator 550 reads the data D2 and the parity data DP from the system memory 506 according to the RAID control commands in the shadow register 564, and then performs an exclusive NOR (XNOR) logical operation of data D2 and DP to obtain accurate data D1 (step S707). Finally, the RAID accelerator 550 writes the accurate data D1 to the system memory 506 (step S708). As a result, the central processing unit 502 can read the correct data D1 from the system memory 506 (step S709), and then the disk controller 510 writes the correct data D1 back to the disk 532 (step S710).

According to the embodiments of the invention, the RAID accelerator 550 is built in the Northbridge 504; so that the traffic of the bus connected between the Northbridge 504 and the Southbridge 508 is reduced. Hence, the bandwidth of the bus is released and the latency for reading data from the system memory 506 is also reduced.

While the invention has been described by way of example and in terms of preferred embodiment, it is to be understood that the invention is not limited thereto. To the contrary, it is intended to cover various modifications and similar arrangements (as would be apparent to the skilled in the art). Therefore, the scope of the appended claims should be accorded the broadest interpretation so as to encompass all such modifications and similar arrangements.

What is claimed is:

1. A chipset with RAID access, comprising:
a Northbridge coupled between a central processing unit and a system memory, having a RAID accelerator for performing RAID operations; and
a Southbridge coupled between the Northbridge and a RAID having a plurality of hard disks, for accessing data in the RAID,
wherein the Northbridge further comprises a Northbridge register storing RAID control commands and disk access commands and the Northbridge register further comprises a memory mapping register for storing disk access commands and a shadow register for storing RAID control commands, wherein the RAID accelerator performs RAID operations according to RAID control commands and the Northbridge snoops the memory mapping register and maps RAID control commands from the Southbridge to the shadow register while the memory mapping register is accessed.

2. The chipset as claimed in claim 1 wherein the shadow register is accessed according to a memory mapping input output (MMIO) cycle.

3. The chipset as claimed in claim 1 wherein the Southbridge further comprises:
a disk controller, controlling disk access of the RAID; and
a Southbridge register, storing RAID control commands.

4. The chipset as claimed in claim 1 while performing RAID write, the RAID accelerator reads a first and a second data from the system memory, and performs logical operation of first data and second data to obtain a parity data.

5. A Northbridge with RAID access, the Northbridge coupled between a central processing unit and a system memory, the Northbridge further couples to a RAID through a Southbridge, comprising:
a RAID accelerator, performing RAID operations according to RAID control commands; and
a Northbridge register, storing RAID control commands, wherein the Northbridge register further comprises a shadow register for storing the RAID control commands and a memory mapping register for storing disk access commands and wherein the Northbridge snoops the memory mapping register and maps RAID control commands from a register in the Southbridge to the shadow register while the memory mapping register is accessed.

6. The Northbridge as claimed in claim 5 wherein the shadow register is accessed according to a memory mapping input output (MMIO) cycle.

7. The Northbridge as claimed in claim 5 while performing RAID write, the RAID accelerator reads a first data and a second data from the system memory, and then performs logical operation of the first data and the second data to obtain a third data.

8. A method for performing RAID access, comprising:
snooping, by a Northbridge, a memory mapping register;
mapping, by the Northbridge, a plurality of RAID control commands from a register in a Southbridge to a shadow register while the memory mapping register is accessed;
reading, by the Northbridge, a first data and a second data from a system memory according to the RAID control commands;
performing, by the Northbridge, an exclusive OR (XOR) logical operation of the first data and the second data to obtain a third data; and
writing, by the Northbridge, the third data to the system memory,
wherein both of the shadow register and the memory mapping register exist in the Northbridge and wherein the shadow register stored the RAID control commands and the memory mapping register stored disk access commands for accessing disks of a RAID.

9. The method for performing RAID access as claimed in claim 8 wherein the shadow register is accessed according to a memory mapping input output (MMIO) cycle.

10. The method for performing RAID access as claimed in claim 8 while performing RAID write access, the second data is read from one disk of a RAID.

11. The method for performing RAID access as claimed in claim 8 wherein the first data is written to another disk of the RAID, and the third data is written to the other disk of the RAID after performing the logical operation.

12. The method for performing RAID access as claimed in claim 8 while performing RAID read access, the first data is read from one disk of a RAID and the second data is read from another disk of the RAID.

13. The method for performing RAID access as claimed in claim 12 wherein the third data is written to the other disk of the RAID after performing the logical operation.

* * * * *